Feb. 4, 1969  L. PARKIN ET AL  3,425,723

FASTENER FOR SECURING A KNOB TO THE END OF A ROD

Filed May 16, 1967

INVENTORS
LESLIE PARKIN &
BRIAN RIGLEY,
BY Philip E. Parker
ATTORNEY

United States Patent Office 3,425,723
Patented Feb. 4, 1969

3,425,723
FASTENER FOR SECURING A KNOB TO THE END OF A ROD
Leslie Parkin, Bobbers Mill, and Brian Rigley, Stapleford, England, assignors, by mesne assignments, to United-Carr Incorporated, Boston, Mass., a corporation of Delaware
Filed May 16, 1967, Ser. No. 638,908
Claims priority, application Great Britain, May 27, 1966, 23,954/66
U.S. Cl. 287—53    5 Claims
Int. Cl. F16d 1/08

ABSTRACT OF THE DISCLOSURE

A fastener for securing a knob to the D-shaped end of a rod comprises a resilient sleeve insertible into the recess in the knob and having a concavely curved arm extending axially of the sleeve so as to support the end of the rod.

---

This invention relates to a fastener for securing a knob to the end of a rod and more particularly it relates to a fastener adapted to be secured in a recess in a knob for receiving and frictionally gripping the D-shaped end of a rod.

The present invention provides a fastener for securing a knob to the D-shaped end of a rod comprising a sleeve formed of spring metal having a resilient peripheral wall adapted when inserted into a recess in the knob to make resilient engagement with the wall of the recess, the sleeve including a flattened portion for resiliently engaging the flattened portion of the D-shaped end of the rod when the latter is inserted into the sleeve, the sleeve also being provided with a resilient concavely curved arm extending axially within the sleeve for engaging the curved portion of the D-shaped end of the rod.

The fastener is preferably formed from a single strip of spring metal bent to form a sleeve of substantially D-shape in cross-section, the wall of which is defined by opposed arcuate-shaped portions and a flattened portion integrally connected to one end of each of the arcuate portions. The other ends of the arcuate portions are separated by an axial slot defined by the juxtaposed side edges of the strip from which the fastener is formed.

According to one arrangement, the flattened portion of the sleeve has an extension including a portion extending transversely over one end of the sleeve and an arm extending axially within the sleeve and spaced inwardly of the adjacent wall thereof.

The sleeve is provided with means such as tongues for engaging the wall of the recess or aperture in the knob into which the fastener is adapted to be assembled and further means such as tongues for frictionally gripping the end portion of the rod.

To enable the invention to be fully understood, it will now be described, by way of example, with reference to the accompanying drawings in which.

Figure 1:
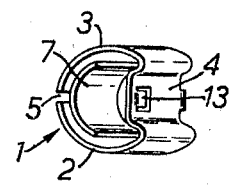
FIGURE 1 is a perspective view of a fastener according to one embodiment of the invention.

As illustrated in the drawings, the fastener is formed from a strip of spring steel which is bent to form a sleeve-like element 1 including opposed curved wall portions 2, 3, integrally connected at their inner ends by a flattened wall portion 4 which, as shown, is offset inwardly so that the sleeve is of substantially D-shape in cross-section. The opposite ends of the curved wall portions are separated by a slot 5 extending axially of the sleeve and which is defined by the juxtaposed side edges of the strip from which the fastener is formed.

The flattened wall portion 4 has an integral extension at one end including a portion 6 extending transversely of the end of the sleeve substantially at right angles to the portion 4 and an arm 7 extending at right angles to the portion 6 axially inwardly of the sleeve and in spaced relation to the inner wall thereof.

The arm 7 overlies the slot 5 and is concavely curved to correspond to the cylindrical surface of the end of the rod which is to be secured by the fastener.

Figure 2:
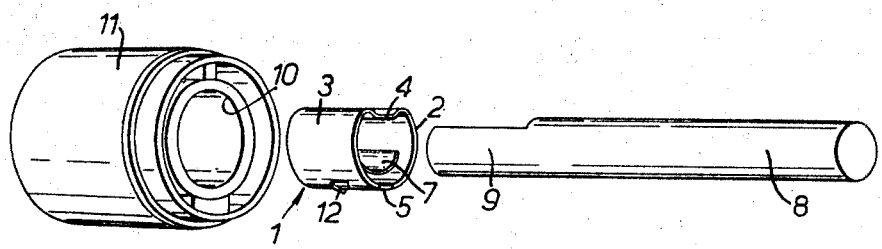
FIGURE 2 is an exploded view in perspective illustrating a knob, fastener and D-shaped rod prior to being assembled with one another.
Figure 3:
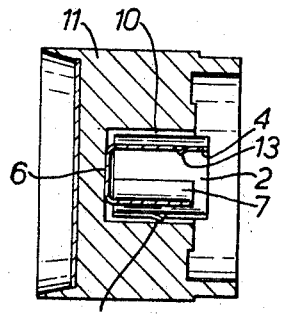
FIGURE 3 is a sectional side view of a knob with a fastener assembled therewith.
Figure 4:
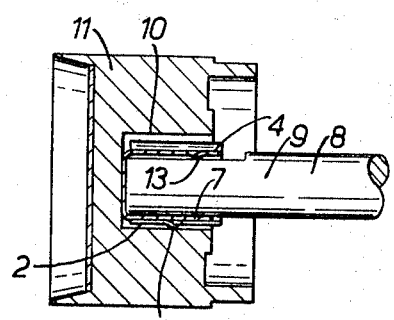
FIGURE 4 is a sectional side view similar to that illustrated in FIGURE 3 but with the rod secured to the knob by the fastener.

As illustrated more particularly in FIGURES 2 to 4, the fastener is used for securing a rod 8 having a D-shaped end 9 in a recess 10 in a knob 11 formed, for example, of synthetic plastics.

The fastener is assembled with the knob 11 by inserting it axially into the recess 10 so that the portion 6 of the sleeve abuts the inner end of the recess. The sleeve is adapted to make a reasonably close fit in the sleeve 10.

Each arcuate wall portion 2, 3, of the sleeve is formed with an outwardly directed tongue 12 adapted to make frictional engagement with the inner wall of the recess when the sleeve is inserted and by digging into the said wall to retain the sleeve in assembly with the knob as illustrated in FIGURE 3. It will be noted from FIGURE 3 that the arm 7 is spaced radially inwardly of the adjacent portion of the wall of the sleeve.

The rod 8 is assembled with the knob by inserting the D-shaped end 9 axially into the sleeve so that the flat of the D slides under the wall portion 4 and the cylindrical surface of the rod at the said end slides over and nests in the concave arm 7.

The dimensions of the D-shaped end of the rod as illustrated in the drawings is such that when the said end is inserted into the sleeve the arcuate walls 2, 3, are expanded radially outwardly into engagement with the wall of the recess 10 so that the tongues 12 are urged into good frictional gripping engagement with the wall of the recess. The arm 7, which is resiliently supported by the transverse portion 6, is flexed outwardly by the rod and makes a close frictional engagement with the cylindrical surface thereof and the flat of the D-shaped end of the rod also makes a close frictional engagement with the inner surface of the wall 4 of the sleeve.

As shown, the flat wall 4 is formed with an inwardly projecting tongue 13 having its free end directed away from the open end of the recess 10 so that it will make frictional engagement with the flat on the D-shaped end of the rod and by digging into the surface thereof will retain the rod in assembly.

Heretofore, it has been necessary that the dimensions of the fastener, recess in the knob and rod should be kept to very close tolerances to ensure that the rod would be properly gripped by the fastener and if, for example, the moulding of the knob produced a recess which was outside the permitted tolerances, or the diameter of the end of the rod was outside such tolerances or if the fastener itself was imperfectly formed, the rod could not be assembled with the knob to provide a satisfactory grip.

By reason of the axial slot 5, the walls of the sleeve are capable of radial movement and the fact that the arm 7 is capable of flexing movement, the fastener receiving recess in the rod and the dimensions of the rod do not have to conform to very close tolerances as the fastener is capable of adapting itself to allow for greater tolerances in these parts.

In the particular embodiment illustrated in the drawings, the knob 11 is adapted to impart a rotational movement to the rod.

We claim:

1. A fastener for securing a D-shaped end of a rod in a recess in a knob comprising a spring metal sleeve adapted to make resilient engagement with the wall of the recess, said sleeve being formed from a single strip of spring metal bent to form two curved wall portions with a flattened portion therebetween for resiliently engaging the flattened portion of the D of the D-shaped end of the rod when the latter is inserted into the sleeve, the opposite ends of the curved wall portions being spaced by a slot extending axially of the sleeve, and a resilient concavely curved arm integrally joined with one end of said sleeve and extending axially within and substantially parallel to the axis of the sleeve for engaging the curved portion of the D of the D-shaped end of the rod, said arm, along the length thereof, being disposed with its concave portion facing said flattened portion of said sleeve and in vertically spaced relationship to the said opposite ends of the curved wall portions of said sleeve.

2. A fastener according to claim 1, wherein said flattened wall portion of said sleeve is formed with an integral extension including a portion extending transversely of one end of said sleeve, said arm being integrally joined to said transversely extending portion of said extension.

3. A fastener according to claim 1, wherein said sleeve is formed with an outwardly extending resilient tongue for making frictional engagement with the wall of the recess in the knob.

4. A fastener according to claim 1, wherein the said flattened portion of said sleeve is formed with an inwardly extending resilient tongue for making frictional gripping engagement with the rod.

5. A fastener assembly comprising a knob having a D-shaped recess in which the D-shaped end of a rod is secured by a fastener comprising a resilient sleeve positioned in the recess, a transversely extending portion on said sleeve disposed adjacent the bottom of the recess, a resilient concavely curved arm integral with said transversely extending portion and extending axially within said sleeve and supporting said rod, an outwardly extending tongue on said sleeve frictionally engaging the wall of said recess and an inwardly extending tongue on said sleeve frictionally engaging said rod.

References Cited

UNITED STATES PATENTS

| 2,256,419 | 9/1941 | Tinnerman. |
| 2,745,689 | 5/1956 | Balint et al. |
| 2,968,504 | 1/1961 | Hansen. |
| 3,130,990 | 4/1964 | Leitmann. |
| 3,329,452 | 7/1967 | Ammon. |

FOREIGN PATENTS 843,555  8/1960  Great Britain.

CARL W. TOMLIN, *Primary Examiner.*

ANDREW KUNDRAT, *Assistant Examiner.*

U.S. Cl. X.R.

292—353